United States Patent [19]
Bader

[11] Patent Number: 5,587,088
[45] Date of Patent: Dec. 24, 1996

[54] PRECIPITATION AND SEPARATION OF INORGANIC SPECIES FROM AQUEOUS SOLUTIONS

[76] Inventor: Mansour S. Bader, P.O. Box 1901, Stillwater, Okla. 74074

[21] Appl. No.: 509,781

[22] Filed: Aug. 1, 1995

[51] Int. Cl.$^6$ .................................. C02F 1/58; C02F 1/62
[52] U.S. Cl. .................. 210/729; 210/702; 210/911; 210/912
[58] Field of Search .......................... 210/729, 702, 210/911, 912

[56] References Cited

U.S. PATENT DOCUMENTS

| | | | |
|---|---|---|---|
| 2,402,668 | 6/1946 | Roller | 23/123 |
| 3,231,340 | 1/1966 | Gaska et al. | 23/300 |
| 3,279,897 | 10/1966 | Goodenough et al. | 23/302 |
| 3,359,076 | 12/1967 | Gaska et al. | 23/300 |
| 3,437,451 | 4/1969 | Every et al. | 23/300 |

*Primary Examiner*—Neil McCarthy
*Attorney, Agent, or Firm*—Dougherty, Hessin, Beavers & Gilbert

[57] ABSTRACT

A process for the precipitation and separation of inorganic species form aqueous solutions. The method comprises the step of adding a miscible organic solvent to inorganic-aqueous solution so that a solid precipitate from the aqueous solution is formed. The resultant solid precipitate is separated from the organic-water mixture. After separating the solid precipitate, the miscible organic solvent is removed and recovered from the organic-water mixture by applying vacuum or other means of recovery. The separated miscible organic solvent can then be condensed and returned to the process. The water is stripped of traces of miscible organic solvent and removed from the system as product water.

18 Claims, 2 Drawing Sheets

Precipitation of Calcium Chloride by Isopropylamine

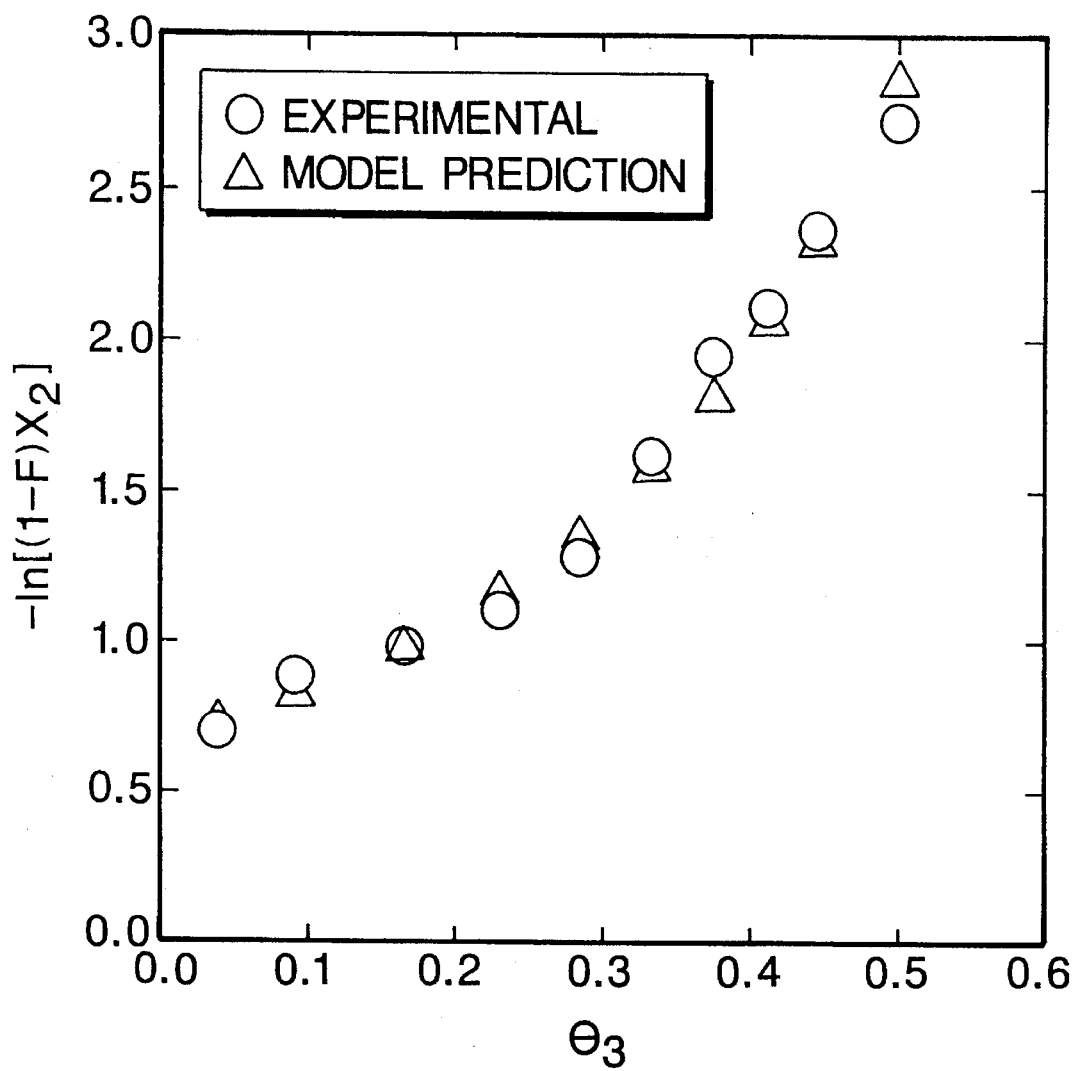
Figure 1. Precipitation of Calcium Chloride by Isopropylamine

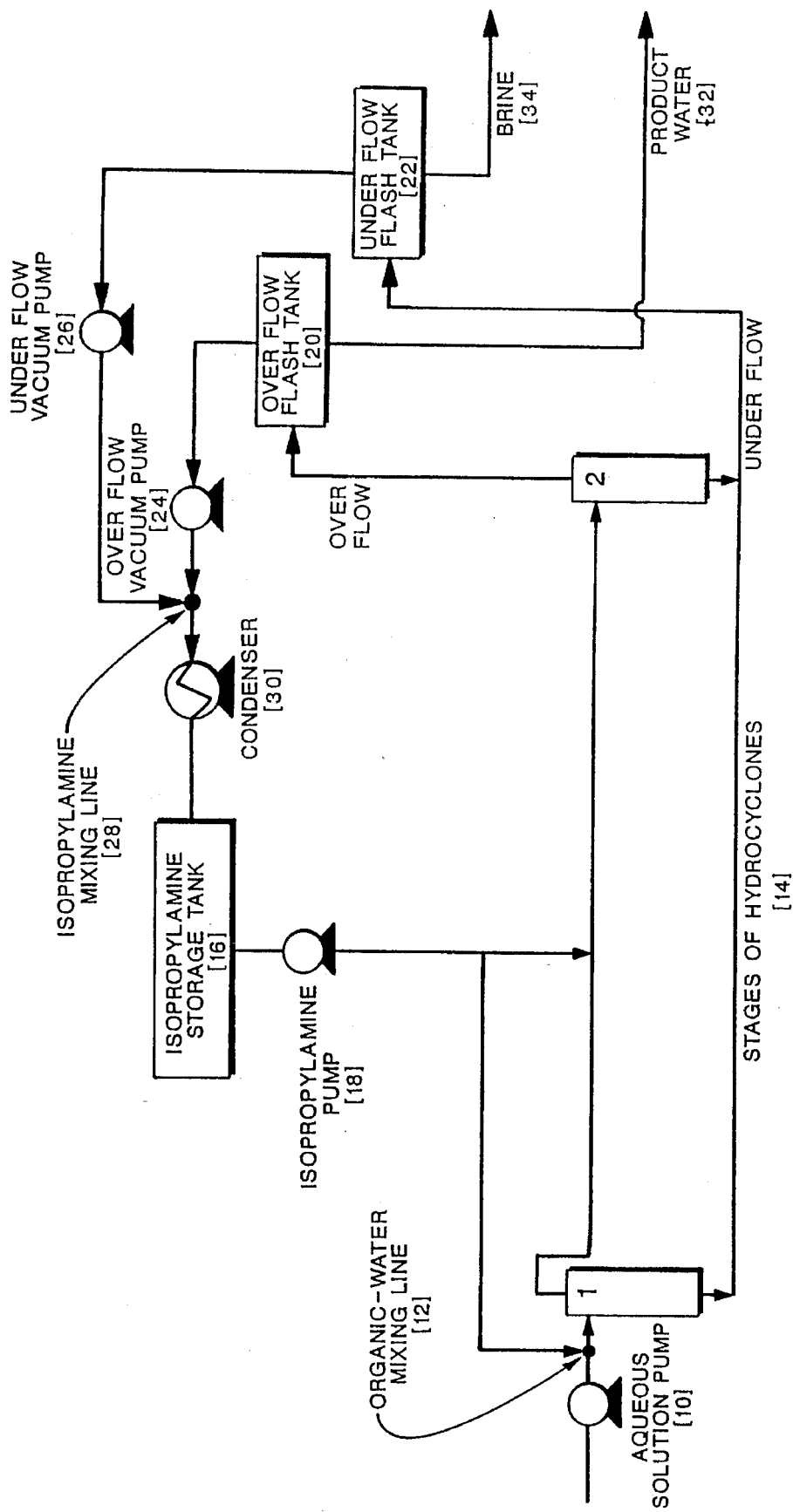
Figure 2. Precipitation and Separation of Inorganics from Aqueous Solution Flow Sheet

PRECIPITATION AND SEPARATION OF INORGANIC SPECIES FROM AQUEOUS SOLUTIONS

BACKGROUND OF THE INVENTION

Water is the mother solvent for a wide variety of naturally occurring inorganic species. Excessive amounts of such species can render water either unusable for general consumption or specific industrial and agricultural uses or pose a high risk to the environment. The term "excessive", however, depends on the acceptable daily intake or virtual safe concentration for these species. It is therefore imperative to precipitate (concentrate) and separate such species to protect both human health and environment.

In most surface waters (e.g.; seawaters) and subsurface waters (e.g.; oil-field brine waters) the dominant anion is chloride with the exception of few cases where bicarbonate and sulfate exceed chloride by weight. In chloride-rich waters, particularly in seawaters, sodium is the dominant cation. In some subsurface waters, however, chloride-rich waters are divided into two major subtypes: (1) sodium is greatly dominated over calcium; and (2) calcium is relatively abundant. Chloride-rich waters that are high in calcium are generally high in alkaline earth elements such as barium chloride, strontium chloride and radium chloride. The availability of radium in chloride-rich waters suggests that the decay chain of radium or the so-called Naturally Occurring Radioactive Materials (NORM) are common, and thus such waters can become radioactive. Radium isotopes, however, are responsible for more than 90% of the total radioactivity found in subsurface waters.

Naturally occurring selenium in both soil and groundwater, is for the most part, present in trace concentrations ranging from insignificant to as much as 3.7 ppm. Commercially, however, selenium is a by-product of several industries such as copper refinery slimes, dusts from copper and lead smelters, sulfuric acid plant sludge, and others. Industrial uses for selenium include, for instance, photoelectric cell production, ceramics, rubber, glass pigmentation, xerography, and flame-proofing of electric cable. The estimated annual release of selenium to the environment is about 10 million pounds. The narrow difference between nutritionally essential and toxic concentrations endows selenium with a unique interest.

Nitrate (or nitrite) and phosphate salts are not generally found in appreciable amounts in surface or subsurface waters. However, the nitrate nitrogen ($NO_3$-N), for instance, is occasionally found in groundwater supplies at concentrations significantly above the recommended limit (10 mg/L). The major sources of this pollution are: (1) nitrified percolation from septic-tank tile fields; (2) drainage and infiltration of fertilizer and feed-lot nitrogen; and (3) groundwater recharge operations using high-rate infiltration of secondary sewage effluents. The nitrate problem in water supplies is widely spread in rural, suburban and even urban areas.

Conventional water treatment processes such as coagulation, filtration (including membrane processes), and chlorination have little effect on the nitrate concentration. This is attributed to: (1) the high solubility of nitrate salts in water; and (2) the lack of co-precipitation and adsorption of nitrate anion. It appears that ion exchange technology is the most promising treatment method for nitrate removal. However, the disposal of the spent nitrate-containing, regenerate-brine solution is an unsolved problem.

As tightening environmental regulations continue to evolve, the disposal problems associate with many separation technologies (e.g., ion exchange and reverse osmosis) are of special interest. Industrial applications such as the electrical and nuclear power industries, for instance, rely heavily on ion exchange as an ultra-pure water technology. Apart from strictly water treatment applications, ion exchange has been used for the concentration, recovery, and purification of valuable inorganic species. The use of membrane processes for the treatment and concentration of cooling tower blowdown of power plants is another example. Each of the above technologies produces brine streams requiring further treatment before disposing (e.g., ponding or downhole injection). Some of the brine streams, however, are contaminated with toxic or radioactive inorganic species.

A treatment for membrane processes in some cases is required to reduce a concentration of scale salts in the feed stream, for instance, to the concentration less than the scale salts saturation aqueous solubilities in the brine stream (30% of the feed stream). Such a treatment is necessitated by the fact that precipitation of scale salts could quickly impede the rejection capability of the membrane and cause membrane fouling.

Identification of a novel process to concentrate and separate inorganic species from aqueous solutions is thus urgently needed. The identified process can either stand alone on its own merits or serve as an integral part of hybrid system in conjunction with other separation technologies. Optimum process development, design, and operation could make disposal alternatives such as downhole injection a more feasible option.

The above situations have led me to invent the process that is described in this invention to alleviate the problems associated with the existence of inorganic species in aqueous solutions.

SUMMARY OF THE INVENTION

A novel process for the precipitation and separation of inorganic species from aqueous solutions is invented. The invented process requires the addition of a miscible organic solvent to an inorganic-aqueous solution so that solid precipitates from the inorganic-aqueous solution are formed. The resultant solid precipitates are then separated from the aqueous solution. After separating the solid precipitates, the miscible organic solvent is removed and recovered from the aqueous solution by applying vacuum, with or without heating, or by using distillation methods. The separated miscible organic solvent can then be condensed and returned to the process, and water is stripped of traces of miscible organic solvent, and removed from the system as product water. Applying vacuum or using distillation methods to strip out the miscible organic solvent from the product water, however, depends upon the required purity of the product water as determined by the economic feasibility and the environmental responsibility.

BRIEF DESCRIPTION OF THE DRAWINGS

For the purpose of illustration of this invention, there are shown in the enclosed figures, a precipitation phase diagram and a process for the precipitation and separation of inorganic species from aqueous solutions. It is to be understood that such figures are for the purpose of illustration only, and that the invention is not limited thereto.

FIG. 1 reveals the precipitation phase diagram of calcium chloride by isopropylamine.

FIG. 2 is a flow sheet revealing the process for precipitation and separation of inorganic species from aqueous solutions.

DESCRIPTION OF THE PREFERRED EMBODIMENT

The present invention provides a method for removing salt from an aqueous solution. The inventive method includes the step of adding an effective amount of a miscible organic solvent to the solution to cause at least a portion of the salt to form a solid precipitate.

Examples of salts removable using the inventive method include salts selected from the group consisting of: chlorides of calcium, barium, strontium, and radium; bicarbonates of sodium, potassium, magnesium, calcium, barium, strontium, and radium; silicates of sodium, potassium, magnesium, and radium; selenites, selenates, and selenides of sodium, potassium, magnesium, calcium, barium, strontium, and radium; selenide salts selected from phosphorous sub-selenide, phosphorous monoselenide, phosphorous tri-selenide, and phosphorous penta-selenide; selenium halide salts selected from selenium mono-chloride, selenium tetra-chloride, selenium mono-bromide, and selenium tetra-bromide; bromides, nitrates, nitrites, and phosphates of sodium, potassium, magnesium, calcium, barium, strontium, and radium; boron salts of sodium, potassium, magnesium, calcium, barium, strontium, and radium; and combinations thereof. Examples of additional salts removable using the inventive method include sulfate salts of sodium, potassium, or radium and carbonate salts of sodium, potassium, or magnesium.

Several miscible organic solvents are appropriate for the use in this invention. The preferred miscible organic solvents are those which: (1) can precipitate a large fraction of inorganic species; and (2) can be vaporized at temperatures near ambient temperature (e.g., low boiling point, relatively high vapor pressure and relative volatility). The fast vaporization of the miscible organic solvent requires only the application of vacuum, which is considerably more economical than the relatively high cost of heat transfer in conventional distillation methods. The above factors primarily determine the best candidate among the miscible organic solvents. However, miscible organic solvents with minimal environmental risks (e.g., not carcinogens) and low cost are preferred.

Examples of miscible organic solvents preferred for use in this invention include amines selected from the group consisting of isopropylamine, propylamine, diisopropylamine, dimethylamine, ethylamine, diethylamine, and combinations thereof.

In the inventive method, precipitation is carried out as a solid-liquid phase equilibrium process. Several miscible organic solvents in their liquid-phase can be used in this invention. Among these solvents are isopropylamine, propylamine, and diisopropylamine. The advantages of using miscible organic solvents in their liquid-phase are: (1) effectiveness at actual conditions (e.g., ambient temperatures); (2) good contact and mixing between species; (3) better control over the dose, transportation and handling of the miscible organic solvent; and (4) better separation of the species in different phases. Preferring miscible organic solvents in the liquid-phase, however, does not preclude the use of other miscible organic solvents in the gas-phase such as dimethylamine, ethylamine, diethylamine, acetaldehyde, and the like.

Isopropylamine is the most preferred miscible organic solvent. Such preference is attributed to: (1) the high precipitating capability of isopropylamine with several inorganic species; (2) the low boiling point (32.5° C.) and very high relative volatility of isopropylamine; and (3) minimal environmental risks. Furthermore, isopropylamine has been used as an herbicide (isopropylamine salt) for agricultural purposes.

The precipitation process is unique. With an aqueous solution containing different inorganic species, the addition of a certain amount of isopropylamine will precipitate these species in different percentages. For instance, the addition of enough isopropylamine to an aqueous solution containing calcium chloride (1:1 volume ratio) will precipitate 92% of the calcium chloride in a pure solid form.

This single precipitation stage process may not be optimal if factors such as the amount of the miscible organic solvent and the energy required to strip off and recover the miscible organic solvent are considered. Better savings in the amount of the miscible organic solvent used and energy required can be achieved by using a multi-stage (2-stage) precipitation process. Thus, it will be more economical for the precipitation of calcium chloride, for instance, with isopropylamine to precipitate 50% in each stage. The volume ratio of isopropylamine to inorganic-aqueous solution to precipitate 50% of the calcium chloride contained in the solution is 0.04 to 1. This amount of isopropylamine will also lead to precipitate different fractions of other present inorganic species.

For the purpose of illustration of the invented process, reference is now made to the flow sheet of the process to precipitate and separate inorganic species from aqueous solutions as shown in FIG. 2. In this process, 27.8 GPM of an aqueous solution (40,000 GPD) containing 1,000 ppm calcium chloride is pumped using the aqueous solution pump [10] to the first stage of multi-hydrocylcones [14] via the organic-water mixing line [12] where it is contacted with 1.1 GPM of isopropylamine (volume ratio of 1 to 0.04). The isopropylamine is fed to the organic-water mixing line from the isopropylamine storage tank [16] using the isopropylamine pump [18].

After that, the solid precipitate in the first stage hydrocyclone is separated from the over flow aqueous mixture by the multi-hydrocylones. With the multi-hydrocyclone design, the under flow for each stage can be limited to approximately 0.4 GPM. Thus, the amount of isopropylamine in the under flow for each stage is about 0.02 GPM and the remainder is water and solid precipitates. These calculations are based on a volume basis, taking into account the specific gravity of the liquid (water and isopropylamine) and solid precipitates.

Thermodynamic behavior provides us with explicit information regarding the intermolecular interactions that take place in the precipitation process. According to the thermodynamic model that predicts the phase-behavior of precipitation process, the fundamental assumption in the design of the hydrocyclone stages is based on the changes in the chemical potentials (fugacities) in terms of physically measurable quantities such as temperature, pressure and composition. At relatively constant temperature and moderate pressure, changing the composition of the miscible organic solvent, combined simultaneously with the change in the composition of the salt due to the precipitation action, will lead to changes in the phase equilibrium of the mixture. Thus, for the second stage of the hydrocyclones, 0.03 GPM of isopropylamine is added to the overflow to compensate for the losses in the under flow in the first stage and to enhance the precipitation process.

Each separation stage contains five hydrocyclones, and each hydrocyclone has a one inch diameter. A valve is installed on the discharge of the under flow chamber to act as a grit pot. With this type of arrangement, one feed pump [10] can be used to the first stage and take the over flow directly into the second stage. Hydrocyclones are able to separate particles ranging from 4 microns to about 600 microns. The use of hydrocyclones in the design of the invented process is attributed to the simplicity of hydrocyclone and cost savings.

After the second stage of hydrocyclones, the over and the under flows are fed into two different vacuum vessels (liquid-vapor separators). These vessels are the over flow flash tank [20] and the under flow flash tank [22], which are used to recover the isopropylamine from both the over flow and the under flow streams using two vacuum pumps [24,26].

The recovered isopropylamine (99.9%) is fed into a condenser (a shell and tube heat exchanger) [30] via the isopropylamine mixing line [28] and then returned to the process via the storage tank [16] and the isopropylamine pump [18].

The product water [32] is removed to an aerated water pond as a product, while the brine [34] is removed to a disposal area. The desorption of isopropylamine from the product water in the aerated pond to the air can be aided by a mechanical agitator.

The operating costs of the invented process reveal that the major factors are the isopropylamine cost and the amount of heat transfer needed to recover isopropylamine. However, these two factors are directly affected by the type and the concentration of inorganic species in the targeted aqueous solution. Calcium chloride is used as an illustrative example that can be easily precipitated from aqueous solution using the invented process with a small number of hydrocyclone stages and relatively a small amount of isopropylamine. As such, the appreciable reduction in the quantity of isopropylamine (and of course the cost) directly leads to a substantial reduction in the amount of heat transfer, and thus a significant reduction in the capital and operating costs of the invented process.

Solid precipitates are in most cases formed in two stages. These stages are either nucleation or crystal growth. In the nucleation precipitates, many nuclei are formed to produce fine precipitates (e.g., calcium chloride). In the crystal growth precipitates, however, a few nuclei are formed and grown slowly to produce coarse precipitates (e.g., barium chloride and strontium chloride). As such, various changes and modifications may be made in the flow sheet to handle the circumstances of the precipitation mechanisms (e.g., a feed stream tank may be needed prior to the separation process).

In the case of soil remediation, soil contaminated with chloride salts, for instance, can be placed into a lined lagoon and mixed with an excess amount of water to dissolve inorganic species and form a make-up aqueous solution. The lagoon could also serve as a clarifier to settle the sediment from the make-up aqueous solution prior to the precipitation and separation process. After that, the invented process can be used to precipitate and separate inorganic species from the make-up aqueous solution.

It should be understood that saline waters such as sea water, brine water, oil-field brine water, formation water, brackish water, ground water, salt lake water, make-up saline solution, brine streams from other separation processes, and the like can be used in this invention. Further, isopropylamine has been mentioned as the preferred miscible organic solvent, but it should be understood that other miscible organic solvents such as propylamine, diisopropylamine, dimethylamine, ethylamine, diethylamine, acetaldehyde, and the like may also be used.

It should also be understood that the operating equipment and conditions set forth may be varied to fit different circumstances such as: (1) the type, concentration, and number of inorganic species present in the aqueous solutions to be precipitated and separated; and (2) the purposes of separating inorganic species from aqueous solutions such as agricultural, brine concentration, scale removal, industrial, electrolytes recovery, soil remediation, carrier free radioactive material recovery and the like; and (3) geographical locations and climate conditions.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of removing salt from an aqueous solution comprising said salt and water, said method comprising the step of adding an effective amount of isopropylamine to said solution to cause at least a portion of said salt to form a solid precipitate, wherein said salt is selected from the group consisting of: chlorides of calcium, barium, strontium, and radium; bicarbonates of sodium, potassium, magnesium, calcium, barium, strontium, and radium; silicates of sodium, potassium, magnesium, and radium; selenites, selenates and selenides of sodium, potassium, magnesium, calcium, barium, strontium, and radium; phosphorous selenide salts selected from phosphorous sub-selenide, phosphorous mono-selenide, phosphorous tri-selenide, and phosphorous penta-selenide; selenium halide salts selected from selenium mono-chloride, selenium tetra-chloride, selenium mono-bromide, and selenium tetra-bromide; bromides, nitrates, nitrites, and phosphates of sodium, potassium, magnesium, calcium, barium, strontium, and radium; and combinations thereof.

2. The method of claim 1 wherein said salt is a chloride salt of calcium, barium, strontium, or radium or a combination thereof.

3. The method of claim 1 wherein said salt is a bicarbonate salt of sodium, potassium, magnesium, calcium, barium, strontium, or radium or a combination thereof.

4. The method of claim 1 wherein said salt is a silicate salt of sodium, potassium, magnesium, or radium or a combination thereof.

5. The method of claim 1 wherein said salt is a selenite salt, a selenate salt, or a selenide salt of sodium, potassium, magnesium, calcium, barium, strontium, or radium or a combination thereof.

6. The method of claim 1 wherein said salt is a phosphorous selenide salt selected from the group consisting of phosphorous sub-selenide, phosphorous mono-selenide, phosphorous tri-selenide, phosphorous penta-selenide and combinations thereof.

7. The method of claim 1 wherein said salt is a selenium halide salt selected from the group consisting of selenium mono-chloride, selenium tetra-chloride, selenium mono-bromide, selenium tetra-bromide and combinations thereof.

8. The method of claim 1 wherein said salt is a bromide salt, a nitrate salt, a nitrite salt or a phosphate salt of sodium, potassium, magnesium, calcium, barium, strontium, or radium or a combination thereof.

9. The method of claim 1 wherein said salt is a boron salt of potassium, magnesium, calcium, barium, strontium, or radium or a combination thereof.

10. A method of removing salt from an aqueous solution comprising said salt and water, said method comprising the step of adding an effective amount of ethylamine to said solution to cause at least a portion of said salt to form a solid precipitate, wherein said salt is selected from the group consisting of: chlorides of calcium, barium, strontium, and radium; bicarbonates of sodium, potassium, magnesium, calcium, barium, strontium, and radium; silicates of sodium, potassium, magnesium, and radium; selenites, selenates and selenides of sodium, potassium, magnesium, calcium, barium, strontium, and radium; phosphorous selenide salts selected from phosphorous sub-selenide, phosphorous mono-selenide, phosphorous tri-selenide, and phosphorous penta-selenide; selenium halide salts selected from selenium mono-chloride, selenium tetra-chloride, selenium mono-bromide, and selenium tetra-bromide; bromides, nitrates, nitrites, and phosphates of sodium, potassium, magnesium, calcium, barium, strontium, and radium; and combinations thereof.

11. The method of claim 10 wherein said salt is a chloride salt of calcium, barium, strontium, or radium or a combination thereof.

12. The method of claim 10 wherein said salt is a bicarbonate salt of sodium, potassium, magnesium, calcium, barium, strontium, or radium or a combination thereof.

13. The method of claim 10 wherein said salt is a silicate salt of sodium, potassium, magnesium, or radium or a combination thereof.

14. The method of claim 10 wherein said salt is a selenite salt, a selenate salt, or a selenide salt of sodium, potassium, magnesium, calcium, barium, strontium, or radium or a combination thereof.

15. The method of claim 10 wherein said salt is a phosphorous selenide salt selected from the group consisting of phosphorous sub-selenide, phosphorous mono-selenide, phosphorous tri-selenide, phosphorous penta-selenide and combinations thereof.

16. The method of claim 10 wherein said salt is a selenium halide salt selected from the group consisting of selenium mono-chloride, selenium tetra-chloride, selenium mono-bromide, selenium tetra-bromide and combinations thereof.

17. The method of claim 10 wherein said salt is a bromide salt, a nitrate salt, a nitrite salt or a phosphate salt of sodium, potassium, magnesium, calcium, barium, strontium, or radium or a combination thereof.

18. The method of claim 10 wherein said salt is a boron salt of potassium, magnesium, calcium, barium, strontium, or radium or a combination thereof.

* * * * *